(12) United States Patent
Dickenson (10) Patent No.: US 7,979,661 B2
(45) Date of Patent: Jul. 12, 2011

(54) MEMORY OVERFLOW MANAGEMENT

(75) Inventor: Marc Alan Dickenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 11/971,991

(22) Filed: Jan. 10, 2008

(65) Prior Publication Data
US 2008/0133866 A1 Jun. 5, 2008

Related U.S. Application Data

(63) Continuation of application No. 10/960,614, filed on Oct. 7, 2004, now Pat. No. 7,350,047.

(51) Int. Cl.
*G06F 12/00* (2006.01)
(52) U.S. Cl. ......... 711/170; 711/171; 711/172; 711/173
(58) Field of Classification Search ................. 711/170, 711/171, 172, 173
See application file for complete search history.

(56) References Cited

U.S. PATENT DOCUMENTS

| | | | |
|---|---|---|---|
| 4,945,548 A | 7/1990 | Iannarone et al. | |
| 5,233,606 A | 8/1993 | Pashan et al. | |
| 6,055,590 A | 4/2000 | Pettey et al. | |
| 6,094,695 A | 7/2000 | Kornher | |
| 6,148,381 A | 11/2000 | Jotwani | |
| 6,209,066 B1 * | 3/2001 | Holzle et al. ................. | 711/153 |
| 6,510,498 B1 * | 1/2003 | Holzle et al. ................. | 711/153 |
| 6,578,094 B1 | 6/2003 | Moudgill | |
| 6,879,266 B1 * | 4/2005 | Dye et al. ........................ | 341/51 |
| 7,178,002 B2 * | 2/2007 | Boucher ........................ | 711/170 |
| 7,181,585 B2 * | 2/2007 | Abrashkevich et al. ...... | 711/170 |
| 7,190,284 B1 * | 3/2007 | Dye et al. ........................ | 341/51 |
| 7,546,588 B2 * | 6/2009 | Dickenson ................... | 717/131 |
| 2001/0054131 A1 * | 12/2001 | Alvarez et al. ................ | 711/105 |
| 2003/0177328 A1 * | 9/2003 | Naganuma et al. ........... | 711/170 |
| 2004/0078542 A1 | 4/2004 | Fuller et al. | |
| 2004/0221120 A1 | 11/2004 | Abrashkevich et al. | |
| 2004/0225925 A1 | 11/2004 | Chen | |
| 2004/0255210 A1 | 12/2004 | Peretz et al. | |

* cited by examiner

*Primary Examiner* — Stephen C Elmore
(74) *Attorney, Agent, or Firm* — Stephen J. Walder, Jr.; Matthew B. Talpis (57) ABSTRACT

Methods, systems, and media to enhance memory overflow management by identifying a memory overflow condition associated with execution of a task and adjusting memory allocation for the task to attenuate the memory overflow condition are disclosed. In particular, embodiments reduce the impact of repetitious memory overflow conditions caused by a specific task by increasing the memory allocation for that task. The memory overflow may also be reported to a technical service provider to help the technical service provider identify and fix the code that is responsible for the memory overflow. Many embodiments monitor an extent of the overflow and determine an allocation correction term based upon the extent of the overflow. In some situations, application of a correction term to increase the memory allocation for the task may advantageously eliminate the cause of the memory overflow condition. In further situations, the impact of the memory overflow condition is attenuated.

13 Claims, 5 Drawing Sheets

FIG. 4

MEMORY OVERFLOW MANAGEMENT

CROSS-REFERENCE TO RELATED APPLICATION

This application is a continuation application of U.S. patent application Ser. No. 10/960,614, now U.S. Pat. No. 7,350,047, entitled "MEMORY OVERFLOW MANAGEMENT", filed Oct. 7, 2004, the disclosure of which is incorporated herein in its entirety for all purposes.

FIELD OF INVENTION

The present invention is in the field of software and hardware design. More particularly, the present invention relates to methods, systems, and media to enhance memory overflow management by identifying a memory overflow condition associated with execution of a task and adjusting memory allocation for the task to attenuate the memory overflow condition.

BACKGROUND

Computer systems are well known in the art. They have attained widespread use for providing computer power to many segments of today's modern society. Computers are available in many different forms such as a desktop, floor standing, or portable computers and include, e.g., one or more central processing units (CPUs) and associated volatile and non-volatile memory. Some computer systems also include a display, an input-output device such as a keyboard and/or a mouse, one or more storage devices such as hard disk drives, and, in many instances, a network interlace adapter. One of the distinguishing characteristics of these systems is the use of a motherboard or system planar to electrically connect these components together. Examples of such computer systems are IBM's e-Server series, ThinkPad series, and Intellistation series.

The widespread use of personal computers in conjunction with networks has resulted in a reliance on the network resources such as e-business enterprises for, e.g., telecommuting, obtaining news and stock market information, trading, banking, shopping, shipping, communicating in the form of Voice Internet protocol (VoiceIP) and email, as well as other services. For many, PCs represent an essential tool for their livelihood. Thus, in today's networked world, the availability and performance of the network is as important as the availability and performance of the personal computer.

Today's e-business environment is very competitive so there is no room for failure. Servers such as the IBM pSeries help e-business enterprises remain competitive by remaining-operational 24/7, 365 days a year. Because reliability is mission-critical, such servers include features to monitor for problems, features to correct or bypass minor problems on the fly, and hot swappable components to allow failed components to be replaced without powering down the server.

Memory overflows, however, are not adequately addressed. Memory overflows refer to situations in which tasks continue to store data in memory locations beyond their memory allocation. When a task exceeds its memory allocation, the task writes data in the space typically left between memory allocations and possibly in the next memory page. The next memory page may be allocated for use by another task so writing data in that memory page corrupts data utilized by another task. If left unchecked, the memory overflow condition may corrupt a sufficient amount of memory to cause that task and/or other tasks to crash. The computer system may even crash depending upon the extent of the overflow and types of tasks affected. The memory overflow condition is temporarily fixed after the task is restarted or the memory overflow forces the computer system to power down and reboot.

Current solutions attempt to avoid rebooting the computer system for memory overflow conditions by implementing memory overflow detection. The memory overflow detection may, for instance, monitor the content of the spaces between, memory allocations to detect when the content of the space is corrupted. If a memory overflow is detected, often referred to as a segmentation violation, the corresponding task is terminated to prevent the memory overflow from affecting the execution of another task. If the task can be restarted without significantly impacting the execution of other critical tasks, the memory allocated to the task and the space are flushed. Then, the task is restarted. On the other hand, some tasks are critical to the continued operation of the computer system such as some of the tasks executed by a service processor of a server. Such tasks may not be restarted without powering down and rebooting the computer system.

Once again, whether the application is restarted or the computer system is rebooted, the memory overflow condition is temporarily fixed. However, powering down and rebooting a network server significantly impacts the availability and reliability of the server, which is a very undesirable effect when availability and reliability are key features for distinguishing the server from a multitude of available servers on the market. For instance, many servers take hours or even days to return to service once they are powered down. Further, the memory overflow condition is not corrected, the condition is just delayed until the next time that the circumstances facilitate a memory overflow by the task.

Upon identifying a memory overflow condition, the condition is reported to a technical support service. The technical support service may attempt to locate the erroneous code, fix the code, and supply the customers with the erroneous code with an update to prevent the error from occurring again. Depending upon the nature of the update, the customers may have to reboot the affected computer systems to install the update.

Therefore, there is a need for methods, systems, and media to enhance memory overflow management by identifying a memory overflow condition associated with execution of a task and adjusting memory allocation for the task to attenuate the memory overflow condition. In some situations, the corrected, condition may eliminate the cause of the memory overflow condition, advantageously eliminating the need to install an update. In further situations, the impact of the memory overflow condition is attenuated, reducing the frequency and/or severity of the memory overflow condition.

SUMMARY OF THE INVENTION

The problems identified above are in large part addressed by methods, systems, and media to enhance memory overflow management by identifying a memory overflow condition associated with execution of a task and adjusting memory allocation for the task to attenuate the memory overflow condition. One embodiment provides a method to manage memory overflow for a computer system. The method generally involves detecting a memory overflow associated with a task, determining an extent of the memory overflow, and determining a correction for a memory allocation provided for execution of the task based upon the extent of the memory overflow. The method may then adjust a memory allocation for the task in accordance with the correction during a subsequent execution of the task by the computer system.

Another embodiment provides an apparatus to manage a memory overflow for a computer system. The apparatus may include a non-volatile memory and a memory overflow manager to detect the memory overflow associated with a task; determine an extent of the memory overflow; and determine a correction for a memory allocation provided for execution of the task based upon the extent of tire memory overflow. After the memory overflow manager stores the correction in the non-volatile memory, a memory allocator may then adjust a memory allocation for the task in accordance with the correction during a subsequent execution of the task by the computer system.

Yet another embodiment provides a machine-accessible medium containing instructions, which when executed by a machine, cause said machine to perform operations. The operations may involve detecting a memory overflow associated with a task, determining an extent of the memory overflow, and determining a correction for a memory allocation provided for execution of the task based upon the extent of the memory overflow. The operations may then adjust a memory allocation for the task in accordance with the correction during a subsequent execution of the task by the computer system.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to enhance memory overflow management by identifying a memory overflow condition associated with execution of a task and adjusting memory allocation for the task to attenuate the memory overflow condition are contemplated. In particular, embodiments reduce the impact of repetitious memory overflow conditions caused by a specific task by increasing the memory allocation for that task. The memory overflow condition may also be reported to a technical service provider such as IBM to help the technical service provider identify and fix the erroneous code that is responsible for the memory overflow.

Many embodiments monitor an extent of the overflow and determine an allocation correction term based upon the extent of the overflow. For example, a memory overflow manager may allow the task to continue to overwrite memory until the overflow reaches a threshold. In some embodiments, threshold may be based upon the number of cycles consumed during the overflow condition. In further embodiments, the threshold may be based upon an amount of memory overflow such as a granule or a page. In other embodiments, the threshold may be based upon a one or more factors such as the impact of the overflow on execution of another task in terms of time and/or data corruption, the amount of memory overwritten, the amount of time consumed by the task, etc.

In some situations, application of a correction term, to increase the memory allocation for a task may advantageously eliminate the cause of the memory overflow condition and thus, eliminate the need to install an update. For example, a memory overflow may result from an erroneous memory allocation designation for a task. Embodiments may monitor the actual use of memory by the task and correct the memory allocation with the first correction term or by incrementally increasing file correction term to increase the memory allocation for the task as the task causes memory overflows. If the task is critical to the operation of, e.g., a server, the customer may prefer to delay installation of an update that fixes the coding of the task if the overflow may not occur again.

In further situations, the impact of the memory overflow condition is attenuated, reducing the frequency and/or severity of the memory overflow condition. For instance, if the erroneous coding of the task requests an ever-increasing amount of memory over a long period of time, embodiments may incrementally correct, the memory allocation for the task, increasing the intervals between instances of the memory overflow condition. In some of these situations, the interval between restarting the task and the next memory overflow condition may be longer than the amount of time needed to receive and install an updated task that corrects the erroneous coding.

While portions of the following detailed discussion describe embodiments of the invention in computers such as servers and personal computers, embodiments incorporated into specific purpose machines or other arrangements subject to potentially repetitive memory overflow conditions resulting from an erroneous implementation of a task are also contemplated.

Figure 1:
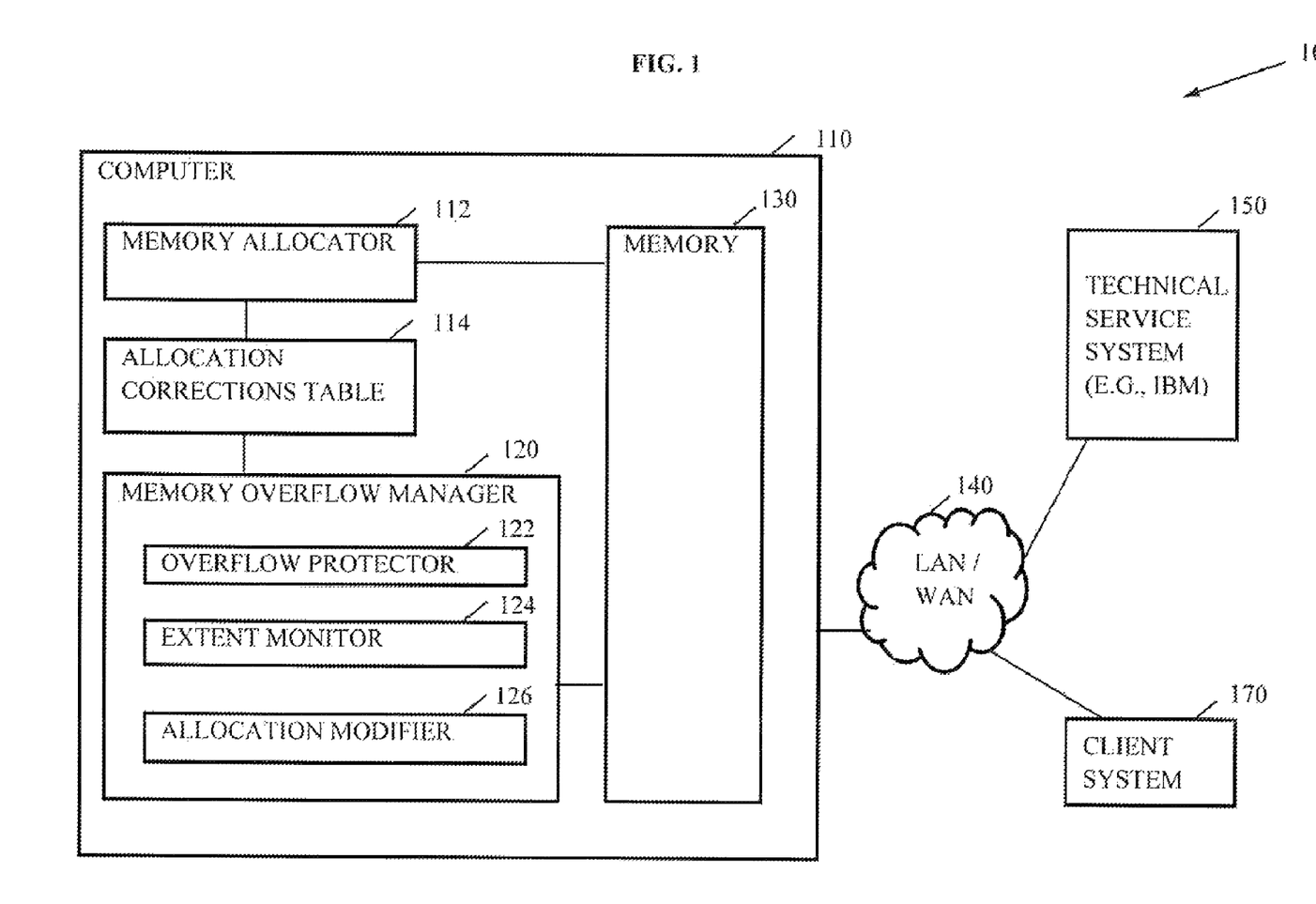
FIG. 1 depicts an embodiment of a system including a computer, which incorporates a memory overflow manager to identify and modify a memory allocation in response to a memory overflow condition to attenuate the impact of subsequent memory overflow conditions on the system.

Turning now to the drawings, FIG. 1 depicts an embodiment of a system 100 including a computer 110 that is adapted to detect, memory overflow conditions associated with tasks and adjust memory allocations for the tasks to attenuate and/or eliminate the memory overflow conditions when the tasks are restarted. More specifically, system 100 may include computer 110, a local area network/wide area network (LAN/WAN) 140, a technical service system 150, and a client system 170. Computer 110 may be a server such as for an office, an Internet provider service (ISP), or the like. In some embodiments, computer 110 may be a partition of a logically partitioned system.

Computer 110 may be adapted to remain powered on and operational for many years, reporting any software and/or hardware errors to technical service system 150. For example, if an error such as a memory overflow occurs during execution of firmware tasks, the computer 110 may restart the firmware and report the overflow condition to technical service system 150. Technical service system 150 may be a technical service provider such as IBM and reporting the error to technical service system 150 may initiate an effort to determine the source or cause of the memory overflow condition. In other situations, the memory overflow may cause the service processor to reset and restart or even cause computer 110 to power down. In such situations, computer 110 reports the error to technical service system 150, identifying the task(s) associated with the overflow condition.

Computer 110 may include a memory allocator 112, an allocation corrections table 114, a memory overflow manager 120, and a memory 130. Memory allocator 112 may be hardware and/or software being executed to allocate memory for tasks executing on computer 110 such as tasks executing on a service processor. Memory allocator 112 also determines whether allocation corrections table 114 includes an indication to correct the standard or default memory allocation. For example, memory allocator 112 may scan the allocation corrections table 114 for an entry in response to receipt of a request for a memory allocation from a task. When memory allocator 112 locates a correction term in the allocation corrections table 114, the correction term may be applied to the requested allocation to determine an adjusted allocation. Memory allocator 112 then allocates memory to the task based upon the adjusted allocation. On the other hand, if no correction term is found, memory allocator 112 may allocate memory to the task based upon the requested allocation.

Allocation corrections table 114 may be a non-volatile memory such as non-volatile random access memory (NVRAM) or flash memory and is adapted to maintain correction terms for memory allocations of tasks. In particular, if a task overflows its memory allocation, memory overflow manager 120 stores a correction term in allocation corrections table 114. In some embodiments, memory overflow manager 120 may increment the correction term each time that task experiences an memory overflow condition. Memory allocator 112 may then apply a corrective memory allocation adjustment to the memory allocation requested for the task based upon the magnitude of the correction term. In further embodiments, memory allocator 112 may apply a pattern of memory allocation adjustments based upon the magnitude of the corrective term. The pattern may increase the corrective memory allocation adjustment at, e.g., an exponential rate per increase in the magnitude of the corrective term. The increase in memory allocation per increase in the magnitude of the corrective term may be designed to minimize or substantially reduce the occurrence of memory overflow conditions resulting from erroneous code of one task.

In other embodiments, the increase in memory allocation per increase in the magnitude of the corrective term may be substantially linear. Such embodiments may be more advantageous in situations that have limited amounts of memory available for allocation to the task.

Memory overflow manager 120 may be hardware or a representation of a software function adapted to identify and determine a correction term based upon a memory overflow condition encountered in response to execution of a task. In some embodiments, memory overflow manager 120 may measure an extent of the memory overflow and, in such embodiments, memory overflow manager 120 may protect memory allocated to other executing tasks.

Memory overflow manager 120 may include an overflow protector 122, an extent monitor 124, and an allocation modifier 126. Overflow protector 122 may protect the contents of memory that may be corrupted by the memory overflow. For instance, for embodiments that allow a memory overflow condition to corrupt up to a threshold of two pages of memory 130, overflow protector 122 may, e.g., remap the contents of the pages to another memory location that is safe from corruption by this memory overflow. More specifically, overflow protector 122 may copy the contents of the pages to another location and modify the corresponding page table to associate the new location with the logical addresses utilized by the corresponding tasks to access the pages. The overflow condition may then continue to corrupt up to two pages of data without corrupting data utilized by other tasks and while allowing critical tasks to continue to execute.

In other embodiments, the task producing the memory overflow condition may be given the highest or one of the highest priorities for execution, pausing tasks that have a lower priority for execution, in such embodiments, overflow protector 122 may remap pages for one or more of the tasks having the highest priorities to another location in memory 130 to avoid data corruption. Overflow protector 122 may also copy the remainder of the pages potentially affected to another location to avoid corruption.

Figure 2:
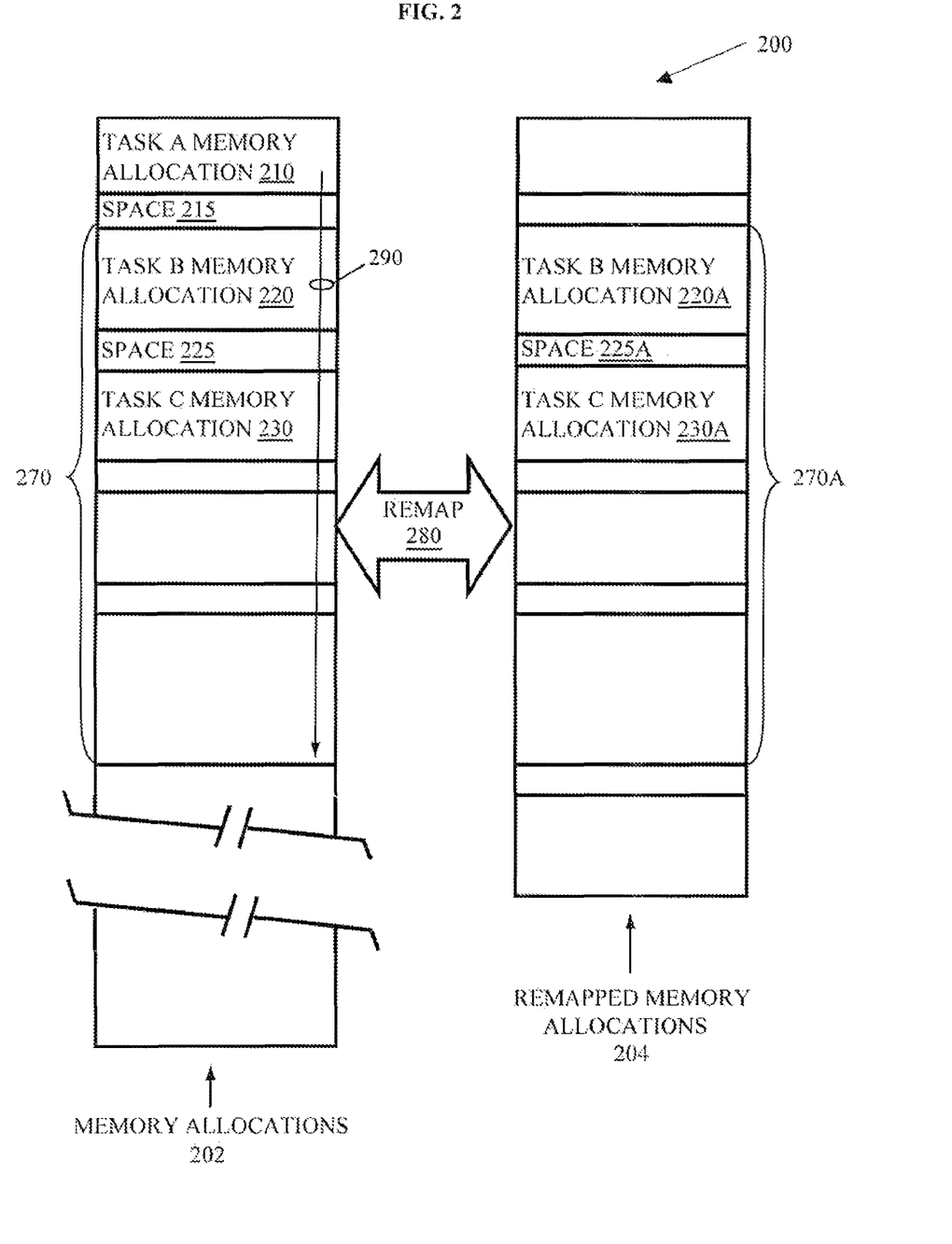
FIG. 2 depicts memory being remapped in response to a memory overflow condition to illustrate an embodiment of the overflow protector in FIG. 1.

FIG. 2 illustrate memory 200 in which memory allocations 202 are being remapped to remapped memory allocations 204 in response to a memory overflow condition to illustrate an embodiment of the overflow protector 122 in FIG. 1. More specifically, three tasks are executing, tasks A, B, and C. Task A has a memory allocation 210 of physical memory. A space 215 divides the memory allocation 210 from a memory allocation 220 for task B and a space 225 separates memory allocation 220 from a memory allocation 230 for task C.

Task A has erroneous coding that causes task A to begin to write data in space 215 and possibly beyond through contiguous memory pages 290. Memory overflow manager 120 identifies a corrupted pattern of bits in space 215 or near the end of memory allocation 210. In response, memory overflow manager 120 initiates overflow protector 122 to protect data maintained in contiguous memory such as memory allocation 220, space 225, and memory allocation 230 from task A. Overflow protector 122 may move or backup and restore memory to protect the memory from corruption.

In the embodiment illustrated in FIG. 2, overflow protector 122 moves or remaps 280 the memory pages 270 to memory pages 270A. After the pages are remapped, for example, task B accesses its memory allocation via the same logical addresses as it did for memory allocation 220 but those logical addresses are translated into the physical addresses for memory allocation 220A. Similarly, task C-accesses its memory allocation via the same logical addresses as it did for memory allocation 230 but those logical addresses are translated into the physical addresses of memory allocation 230A. Further, memory overflow manager 120 may monitor space 225A rather than space 225 for a memory overflow condition associated with task B.

In some embodiments, the memory allocations will be remapped only when sufficient additional memory is available to remap or copy the memory allocations. In such embodiments. If insufficient memory is available to remap or copy a default threshold of four pages 270, overflow protector 122 may reduce the threshold accordingly. For situations in which no memory is available to remap or copy the four pages 270, memory overflow manager 120 may terminate execution of task A while task A is corrupting the content of space 215, extent monitor 124 may determine a default extent of memory overflow and allocation modifier 126 may determine a correction term based upon the default extent.

Extent monitor 124 may determine an extent of the memory overflow by a task such as task A. In some embodiments, extent monitor 124 determines whether the memory overflow surpasses a threshold and provides a corresponding indication to allocation modifier 126 to determine a correction term. In other embodiments, extent monitor 124 may determine whether the memory overflow surpasses one or more of multiple thresholds. For example, task A may request less than a page of memory but receive an allocation 210 of a full, page of memory. Memory overflow manager 120 may insert a pattern of bits into the portion of memory allocation 210 that was not requested and a pattern of bits in spaces 215 and 225. Extent monitor 124 may then monitor the content of the portion of memory allocation 210 that was not requested as well as the patterns of bits in the spaces.

In some embodiments, extent monitor 124 may determine checksums for portions of pages 270 to facilitate overflow extent determinations at a smaller granularity than a page and monitor for changes in the checksums. In further embodiments, memory overflow manager 120, upon remapping or copying pages 270 to pages 270A may store one or more patterns of bits in pages 270 at one or more locations to facilitate monitoring of the extent of the memory overflow.

Allocation modifier 126 determines a correction term for the tasks such as task A that cause a memory overflow condition based upon an extent indication from extent monitor 124 and, in some embodiments, based upon an amount of available memory to allocate the tasks. Allocation modifier 126 may, for example, increment a count maintained in allocation corrections table 114 for the task or create a new entry for the task and store a new correction term for the task.

In several embodiments, allocation modifier 126 may determine a correction term based upon a number of indications received from extent monitor 124 and the magnitude of a corrective term stored in allocation corrections table 114 for the corresponding task. For example, allocation modifier 126 may read the contents of allocation corrections table 114 for the task associated with a memory overflow and calculate a new term based upon the indication from extent monitor 124. Allocation modifier 126 may then store the new term in allocation corrections table 114 prior to restarting the application.

Memory 130 may be a volatile memory designed to store and facilitate access to runtime data for tasks. The task may be a function for any level of an application from a high level, e.g., word processor, to a low-level firmware code for a service processor. For instance, memory 130 may include RAM, dynamic RAM, double data rate RAM, synchronous dynamic RAM, or other read-writeable medium.

LAN/WAN 140 is a network connection to couple computer 110 with technical service system 150 and client system 170 to facilitate communications. In some embodiments, LAN/WAN 140 may include a network in an office coupled via Ethernet, optical media like OptiConnect, a wireless network, or the like. In several embodiments, LAN/WAN 140 also couples with the Internet via a cable modem, a digital subscriber line (DSL), a T1 line, a T3 line, or the like. In further embodiments, LAN/WAN 140 may include a network of temporary connections such as connections via a telephone system.

Client system 170 may be a computer system at a different office location or at a client's facility. Client system 170 may include any type of computer system or data storage system having a TCP/IP interface, or the like, for receiving and transmitting transactions via LAN/WAN 140. In several embodiments, the availability of computer 110 is critical for operations performed by client system 170.

Figure 3:
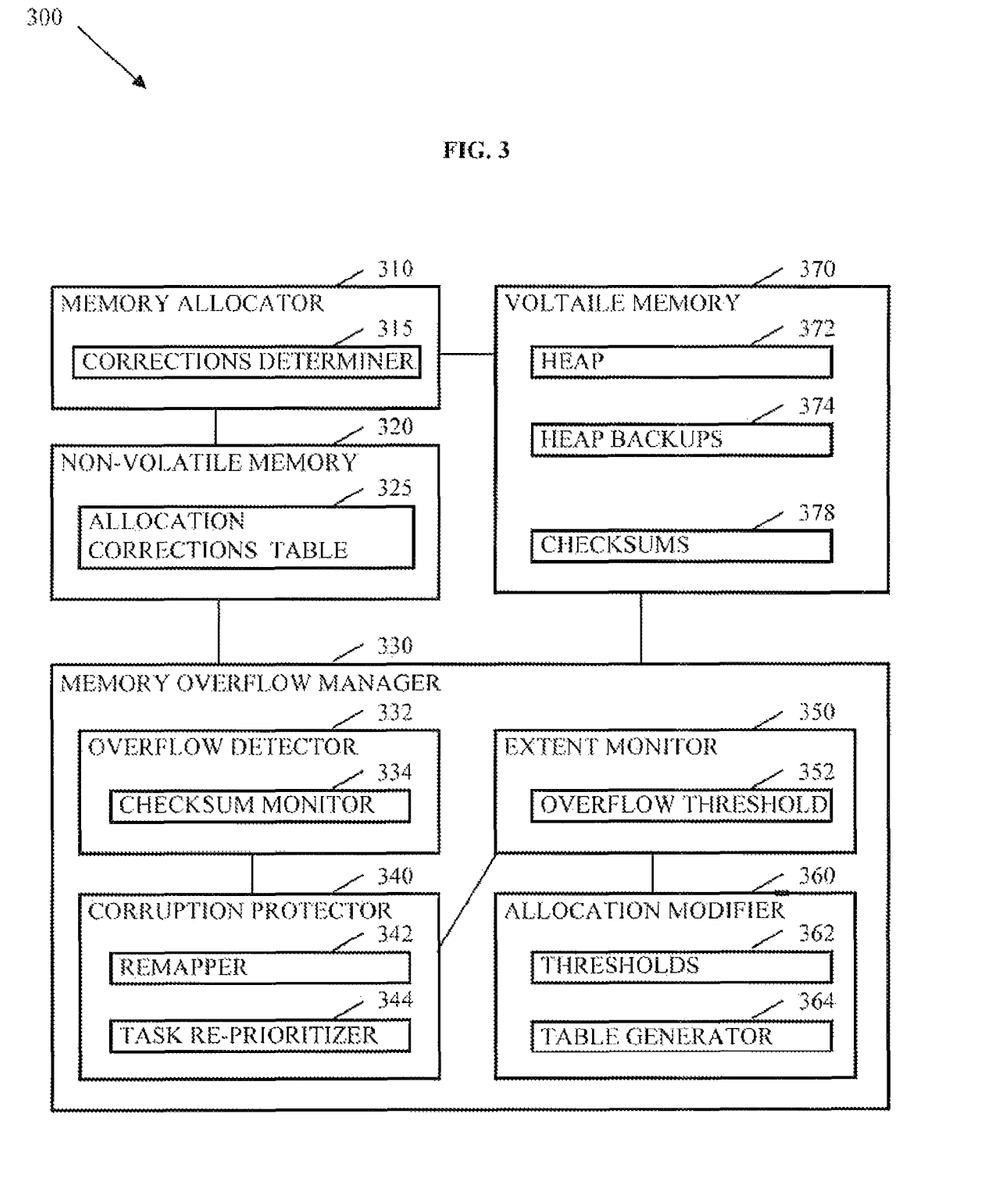
FIG. 3 depicts an embodiment of an apparatus adapted to identify a memory overflow condition associated with execution of a task and adjust memory allocation for the task to attenuate the memory overflow condition.

FIG. 3 depicts an embodiment of an apparatus 300 adapted to identify a memory overflow condition associated with execution of a task and adjust memory allocation for the task to attenuate the memory overflow condition. Apparatus 300 includes a memory allocator 310, a non-volatile memory 320, a memory overflow manager 330, and a volatile memory 370.

Memory allocator 310 may establish heap 372 in volatile memory 370 for tasks as the tasks are loaded and executed in response to allocation requests. The allocation requests may be coded in the tasks and/or may reside in firmware. Memory allocator 310 includes a corrections determiner 315. Corrections determiner 315 may associate each task with a corresponding entry in an allocation, corrections table 325 of non-volatile memory 320. If no corresponding entry exists, memory allocator 310 may allocate memory from volatile memory 370 to the task based upon the size of the allocation request and the granularity of the memory allocations offered by memory allocator 310.

Non-volatile memory 320 may include a data storage adapted to retain data when apparatus 300 is powered down. Non-volatile memory 320 may include allocation corrections table 325. Allocation corrections table 325 may include entries for, e.g., each task executed in a service processor and associate each task with a correction term. In some embodiments, a default correction term is included for each task to enhance reliability and availability of apparatus 300. For instance, if the amount of non-volatile memory 370 available for allocation to tasks is greater than the memory actually utilized, a correction term to increase requested memory allocations by, e.g., five percent may be associated with each task via allocation corrections table 325, advantageously taking a proactive step to avoid down-time related to memory overflow conditions. In other embodiments, memory overflow manager 330 may incorporate corrections to memory allocations for tasks into the code or firmware father than maintaining a separate table for corrections in non-volatile memory 320.

Memory overflow manager 330 monitors heap 372 in volatile memory 370 to detect memory overflow conditions, protect data associated with executing tasks and adjust the memory allocation for the task identified with the memory overflow to try to avoid or at least attenuate the impact of a subsequent memory overflow by the same task. Memory overflow manager 330 may include an overflow detector 332, a corruption protector 340, an extent monitor 350, and an allocation modifier 360.

Overflow detector 332 may monitor the content of heap 372 to determine whether a memory overflow condition is occurring. Upon detecting a memory overflow, an indication of the memory overflow condition as well as the task responsible for the memory overflow is forwarded to a technical service provider to report the error. Overflow detector 332 includes a checksum monitor 334.

Checksum monitor 334 may determine checksums and monitor for memory overflows via the checksums. For example, checksum monitor 334 may determine a 32-bit checksum that covers the unutilized portion of each page of memory allocations and store the checksum in checksums 378 of volatile memory 370. Then, checksum monitor 334 periodically determines a new 32-bit checksum in a similar manner and compares the new checksum against the corresponding checksum stored in checksums 378. When the checksums are different, a memory overflow condition exists and the task associated with that memory page may be responsible.

Corruption protector 340 may be adapted to protect memory allocations for tasks against memory overflows. Corruption protector 340 includes a remapper 342 and a task re-prioritizer 344. Remapper 342 may remap the memory allocation for the task responsible for the overflow to an alternative physical location within heap 372 that has sufficient memory to allow the overflow to continue without significantly interfering with the execution of other tasks. On the other hand, when insufficient contiguous memory is available, remapper 342 may map the memory to more than one noncontiguous memory locations.

Task re-prioritizer 344 is designed to essentially pause tasks that can be paused without significantly impacting a critical operation so the memory overflow can continue. Task re-prioritizer 344 copies memory for tasks that may be affected by the overflow into heap backups 374 to prevent corruption and pauses those tasks. Extent monitor 350 may then monitor the progress of the memory overflow as the task responsible for the memory overflow continues to execute to determine the extent of the memory overflow by that task. Upon determining the extent of the memory overflow, extent monitor 350 communicates the extent of the memory overflow to allocation modifier 360. After the extent of the memory overflow is determined, the memory copied into heap backups 374 is copied back into heap 372 before the corresponding tasks are allowed to continue running.

In some embodiments, extent monitor 350 includes an overflow threshold 352. Overflow threshold 352 may enforce a pre-determined maximum threshold for memory overflows. For instance, the threshold may limit the number of pages that the overflow condition may affect prior to terminating and restarting the application. In further embodiments, overflow threshold 352 may determine a maximum allowable extent of the memory overflow based upon a limitation in the amount of memory that could be protected against the overflow condition. And, in other embodiments, overflow threshold 352 may determine a threshold based upon the amount of time available to pause other tasks. In some embodiments, a combination of these and/or other factors may play a role in determining a threshold for the memory overflow condition.

Allocation modifier 360 determines a correction term for a memory allocation made to a task when the taste is responsible for a memory overflow, based upon an extent of the overflow detected. In some embodiments, allocation modifier 360 calculates the correction term based upon the extent of the overflow. In further embodiments, allocation modifier 360 selects the correction term from a pre-determined set of correction terms in thresholds 362 based upon the extent of the memory overflow, or the threshold that the memory overflow surpassed. For example, an error in the coding for a task may result in an allocation request that is less memory than is necessary for executing the task. The memory overflow may occur only in response to combinations of events occurring concurrently but these events may occur once a month during the normal operation of apparatus 300. The first time the memory overflow is detected by overflow detector 332, extent monitor 350 determines the extent of the memory overflow, table generator 364 creates allocation corrections table 325, and allocation modifier 360 stores a correction term in allocation corrections table 325 for that task. Memory overflow manager 330 restarts the task and a new, adjusted memory allocation is made for the task, which includes the original allocation plus an additional allocation equal to or greater than the extent of the overflow monitored during a previous execution of the task. Thus, apparatus 300 automatically fixes the error in the coding of the task and, advantageously, does not need an update for the task to avoid the memory overflow condition.

In other situations, allocation modifier 360 may incrementally increase tire magnitude of the correction term to attenuate a memory overflow condition encountered during the execution of the task. For instance, if the erroneous coding of the task requests varying amount of memory over a long period of time, allocation modifier 360 may not detect the full extent of the memory allocation problem until after several memory overflow conditions are encountered. Such embodiments may incrementally correct the memory allocation for the task, over a period of time and continue until an update that fixes the erroneous code of the task is available.

Figure 4:
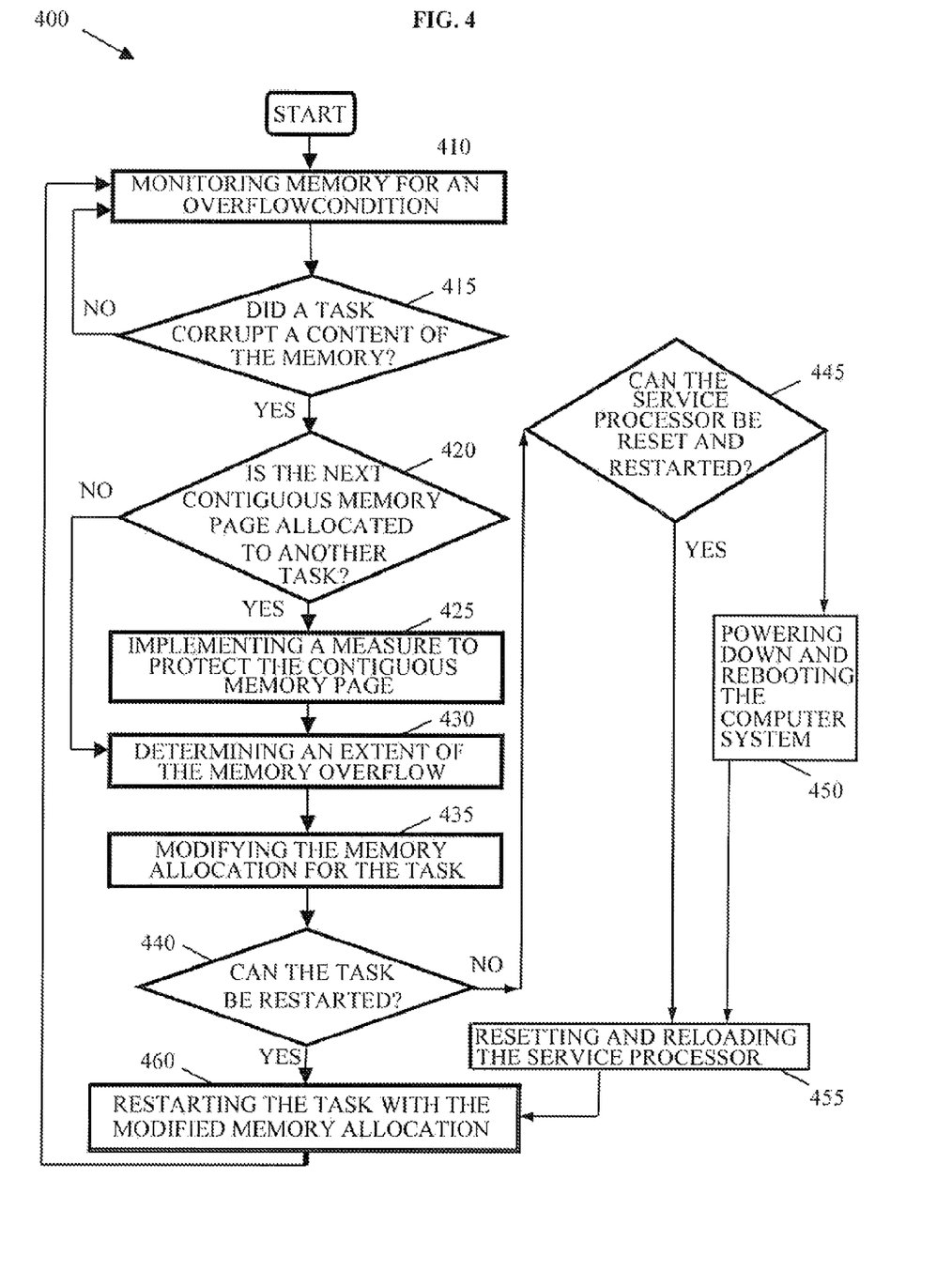
FIG. 4 depicts a flowchart of an embodiment adapted to identify a memory overflow condition associated with execution of a task and adjust memory allocation for the task to attenuate the memory overflow condition.

Referring now to FIG. 4, there is shown a flowchart of an embodiment computer such as computer 110 of FIG. 1 adapted to identify a memory overflow condition associated with execution of a task and adjust memory allocation for the task to attenuate the memory overflow condition. Flow chart 400 begins with monitoring memory for an overflow condition (element 410). In particular, a memory overflow manager such as the memory overflow manager in FIG. 1, may monitor the contents of spaces, magic numbers, or the unused portions of a memory allocation for a task to determine if the task begins to store data outside its memory allocation. Magic numbers are special bit patterns that are recognizable and could be stored in the spaces between memory allocations for tasks.

The memory manager continues to monitor the memory for an overflow condition until a memory overflow occurs (element 415). However, if a task corrupts a content of a space or an unused portion of a memory allocation that was not requested, the memory overflow manager determines whether one or more contiguous pages of the memory have been allocated to other tasks (element 420). If so, a measure is taken to protect the contents of the contiguous memory pages and to prevent another task from failing or reporting another error as a result of the overflow condition (element 425). For example, the memory manager may protect the contents of contiguous memory pages by copying the contents to another location and restoring the contents after monitoring, the memory overflow further.

After the contents contiguous memory pages are protected against corruption by the memory overflow or when the contiguous memory pages are not allocated to another task, the erroneous task can continue to execute, allowing the memory overflow to modify the contents of the contiguous pages without impeding the operation of other tasks. The memory overflow is allowed to run its course to measure an extent of the memory overflow (element 430). If a maximum overflow threshold is set, the threshold limits the extent. In some embodiments, determining the extent involves setting an extent based upon detection of the overflow.

Determining the extent allows the memory manager to modify the memory allocation for the task (element 435). For example, the memory manager may select or calculate a correction term for the memory allocation provided to the task based upon the extent of the overflow. In several embodiments, the corrective term is stored in a corrections table in non-volatile memory so the correction can be applied to the allocation request for the task even if the system is powered down.

If the task may simply be restarted (element 440), the task is restarted (element 460), implementing the adjusted memory allocation. However, if the task cannot be restarted without resetting and reloading the service processor (element 445), the service processor will be reset and reloaded (element 455) assuming that the service processor can be reset and reloaded without significantly impacting another operation. On the other hand, if the task cannot be restarted without powering down and restarting the associated computer system, the computer system is powered down and rebooted (element 450) to restart the task and implement the new memory allocation for the task.

Figure 5:
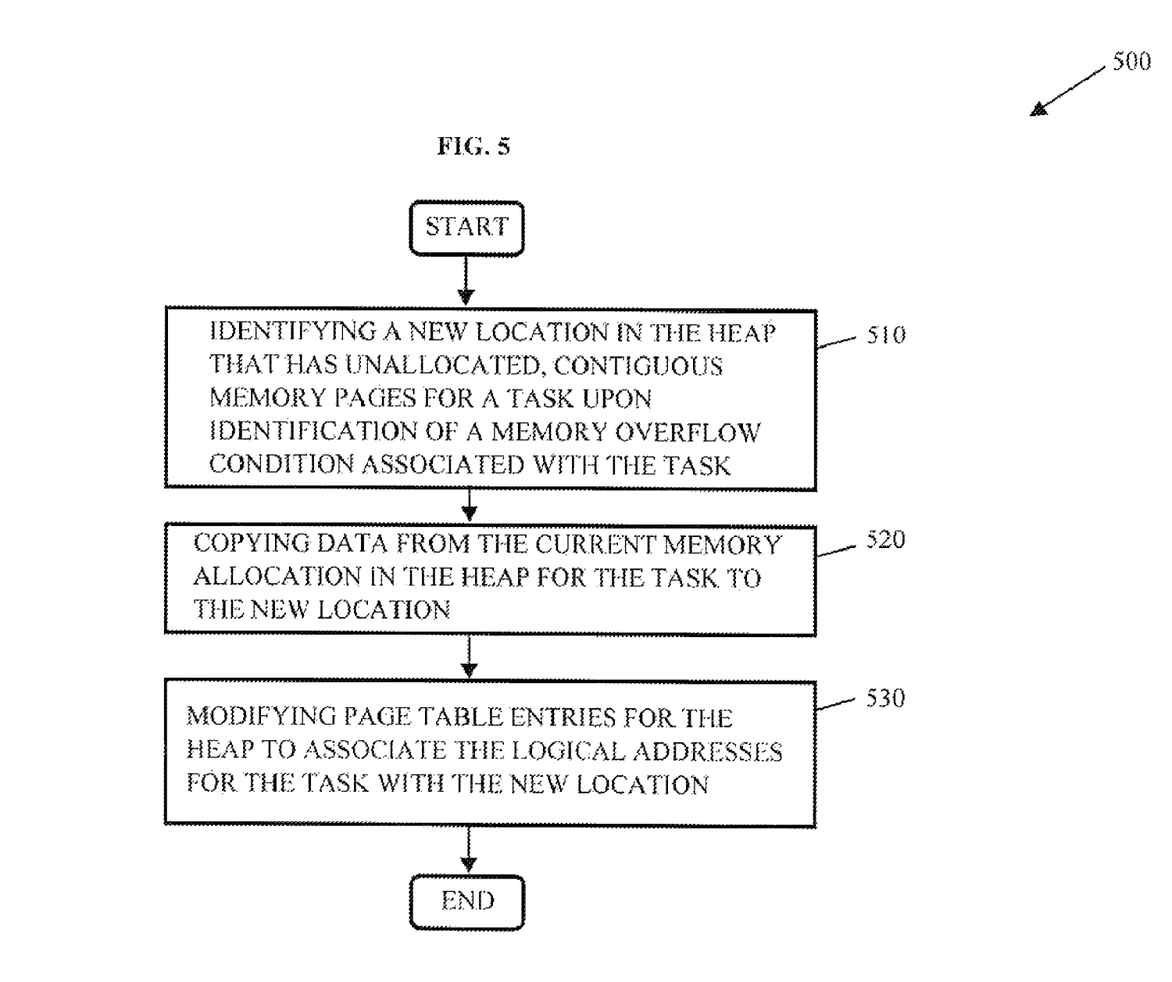
FIG. 5 depicts a flowchart of an embodiment adapted to protect a contiguous memory block from corruption by a memory overflow of FIG. 3 by remapping the memory for the task identified with the memory overflow.

Referring now to FIG. 5, there is shown a flowchart of an embodiment adapted to protect a contiguous memory block from corruption, by a memory overflow such as the memory overflow discussed in conjunction with FIG. 3 by remapping the memory for the task identified with the memory overflow. Flowchart 500 begins with identifying a new location in the heap that has unallocated, contiguous memory pages for a task upon identification of a memory overflow condition associated with the task (element 510). In particular, the data stored in the memory allocation for the task is moved to another location in the heap that has contiguous, unallocated memory pages to allow the overflow to continue so the extent of the overflow can be determined without significantly impacting the execution of other tasks.

Once the new location in the heap is identified, the corresponding memory addresses are allocated for the task and the contents of the previous memory allocation in the heap plus overflow into the space, if any, are transferred to the new location (element 520). Then, the page table for the new location in the heap is modified to associate logical addresses utilized by the task to the new location in the heap (element 530).

In other embodiments, portions of die heap that may be affected by the memory overflow condition when the extent of the memory overflow is being monitored are transferred to a new location in the heap. In further embodiments, the portions of the heap that may be affected by the memory overflow condition are copied to any data storage until the task responsible for the memory overflow is terminated. The tasks associated with the copied data are paused until the data is restored to its original location in the heap.

One embodiment of the invention is implemented as a program product for use with a computer system such as, for example, the system 100 shown in FIG. 1. The program(s) of the program product defines functions of the embodiments (including the methods described herein) and can be contained oh a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying machine-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, Various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that, the present invention contemplates to identify a memory overflow condition associated with execution of a task and adjust memory allocation for the task to attenuate the memory overflow condition. It is understood that the form of the invention shown and described in the detailed description and the drawings are to be taken merely as examples. It is intended that the following claims be interpreted broadly to embrace all the variations of the example embodiments disclosed.

What is claimed is:

1. An apparatus to manage a memory overflow for a computer system, comprising:
 a non-volatile memory;
 a memory overflow manager to detect a change in a memory location by a task outside a memory allocation requested for the task indicative of the memory overflow associated with the task; determine a variable extent of the memory overflow after detecting the change in the memory location by the task outside the memory allocation requested for the task; determine a correction for a memory allocation provided for execution of the task based upon the variable extent of the memory overflow; and store the correction in the non-volatile memory; and
 a memory allocator coupled with the non-volatile memory to adjust a memory allocation for the task in accordance with the correction and allocate an adjusted memory allocation to the task in response to restarting the task by the computer system.

2. The apparatus of claim 1, wherein the memory overflow manager comprises a corruption protector to protect data in memory allocated for another task from corruption while the variable extent of the memory overflow is being determined.

3. The apparatus of claim 1, wherein the memory overflow manager comprises an overflow detector to monitor an unused portion of the memory allocation for a change.

4. The apparatus of claim 3, wherein the overflow detector comprises a checksum monitor to determine a checksum based upon the unused portion and to periodically compare the checksum to a checksum based upon the current content of the unused portion.

5. The apparatus of claim 3, wherein the overflow detector comprises an allocation modifier to calculate a correction term based upon the variable extent of the memory overflow.

6. The apparatus of claim 3, wherein the overflow detector comprises an allocation modifier to select a pre-determined correction term based upon the variable extent of the memory overflow.

7. The apparatus of claim 6, wherein the allocation modifier is adapted to store a correction term indicative of the correction in the non-volatile memory and to increase the memory allocation based upon the correction term.

8. A computer program product comprising a computer useable storage medium having a computer readable program, wherein the computer readable program when executed on a computer causes the computer to perform operations, comprising:

detecting a change in a memory location outside a memory allocation requested for a task to detect a memory overflow associated with the task;

determining a variable extent of the memory overflow after detecting the change in the memory location outside the memory allocation requested for the task;

determining a correction for a memory allocation provided for execution of the task based upon the variable extent of the memory overflow; and adjusting a memory allocation for the task in accordance with the correction during a subsequent execution of the task by the computer system.

9. The computer program product of claim 8, wherein the operations further comprise protecting data in memory allocated for another task from corruption while the variable extent of the memory overflow is being determined.

10. The computer program product of claim 8, wherein detecting the memory overflow comprises monitoring an unused portion of the memory allocation for a change.

11. The computer program product of claim 10, wherein monitoring the unused portion of the memory allocation comprises determining a checksum based upon the unused portion and periodically comparing the checksum to a checksum based upon the current content of the unused portion.

12. The computer program product of claim 8, wherein determining the correction comprises calculating a correction term based upon the variable extent of the memory overflow.

13. The computer program product of claim 12, wherein adjusting the memory allocation comprises storing a correction term indicative of the correction in non-volatile memory and increasing the memory allocation for the subsequent execution based upon the correction term.

* * * * *